United States Patent [19]
Bleau et al.

[11] 3,844,552
[45] Oct. 29, 1974

[54] DOCUMENT FEED DEVICE
[75] Inventors: Charles D. Bleau; James C. Rogers; Jesse W. Spears, all of Lexington, Ky.
[73] Assignee: International Business Machines Corporation, Armonk, N.Y.
[22] Filed: June 12, 1972
[21] Appl. No.: 261,884

[52] U.S. Cl................. 271/245, 271/235, 271/246, 271/264
[51] Int. Cl............................ B65h 5/02, B65h 9/06
[58] Field of Search............ 271/4, 6, 7, 46, 50, 45, 271/47, 235, 245, 246, 264

[56] References Cited
UNITED STATES PATENTS

| | | | |
|---|---|---|---|
| 3,146,902 | 9/1964 | Voelker | 271/7 X |
| 3,339,917 | 9/1967 | Petrovsky | 271/53 X |
| 3,408,140 | 10/1968 | Hemphill | 271/50 X |
| 3,506,257 | 4/1970 | Fackler et al. | 271/4 X |
| 3,565,420 | 2/1971 | Howard | 271/4 |
| 3,595,564 | 7/1971 | DeYoung | 271/46 |

FOREIGN PATENTS OR APPLICATIONS

| 569,306 | 1/1959 | Belgium | 271/4 |
|---|---|---|---|

*Primary Examiner*—Richard A. Schacher
*Assistant Examiner*—James W. Miller
*Attorney, Agent, or Firm*—Laurence R. Letson

[57] ABSTRACT

A document feed device is disclosed which utilizes intermittently operated endless drive belts to transport a document sheet from an entry guide to an exposure zone and from there to an exit hopper where the drive belts are tensioned over the trailing and leading edges of the work station to provide concentrated drive forces at those points and where the leading edge is slightly elevated from the plane of the work station to provide a region of force relief immediately after passing the leading edge. The document is moved into engagement with the drive belt by picker roll mechanism which controls initiation of feed and is accelerated away from the work station by an accelerator roll arrangement which drives the document at a speed faster than it is normally fed to make room for the next document. Alignment is accomplished by an alignment guide having fingers inter-digitated with the plurality of feed belts and providing a positive stop against which the document is lightly urged by the feed belts. The feed belt/work station surface arrangement is such as to provide an increasing urging force in the direction of feed.

4 Claims, 4 Drawing Figures

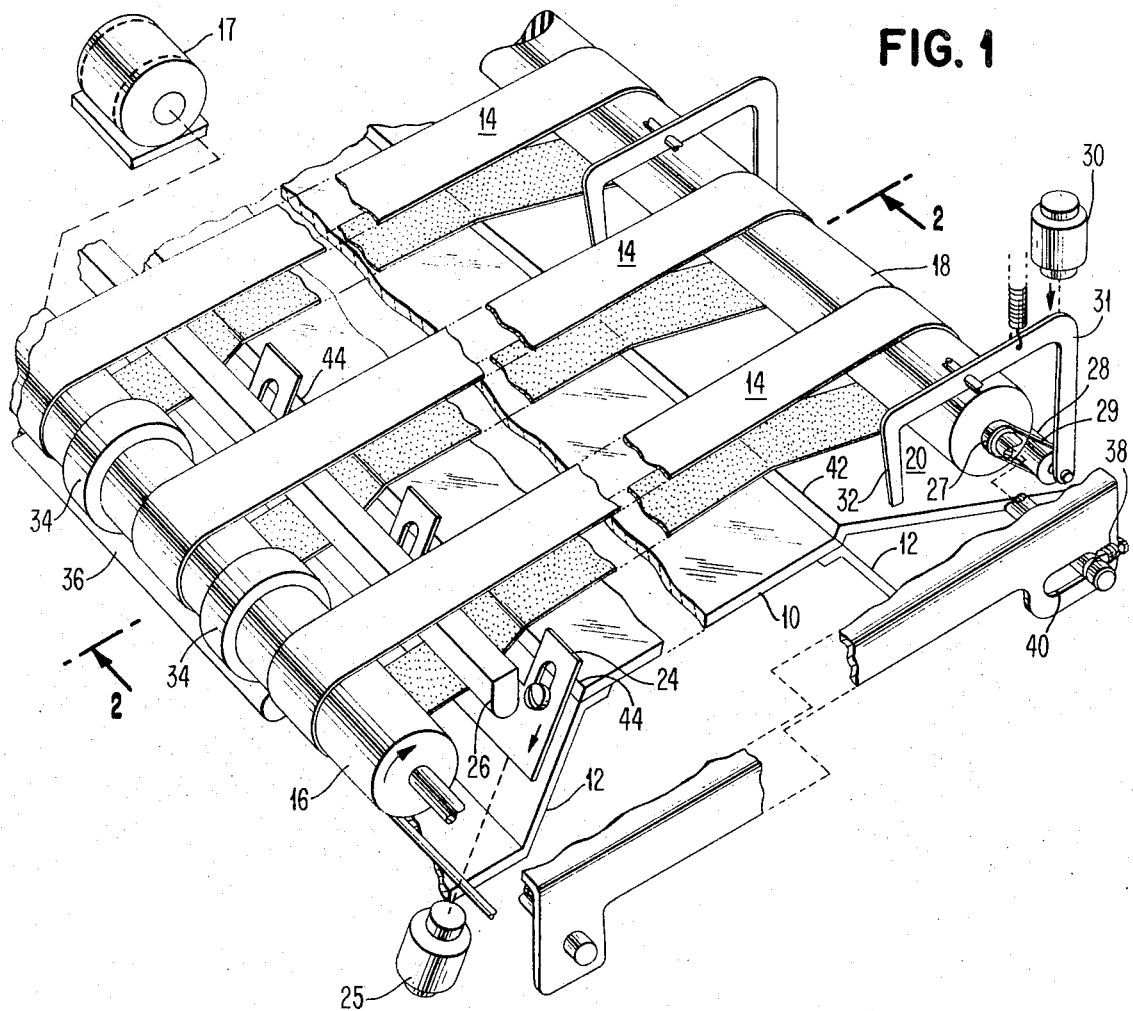
FIG. 1
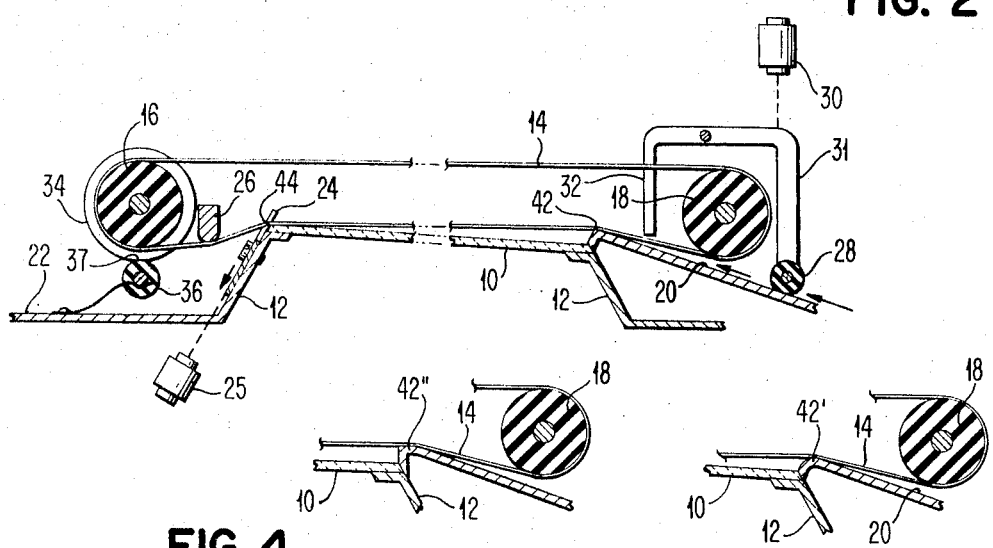
FIG. 2
FIG. 4
FIG. 3

DOCUMENT FEED DEVICE

BACKGROUND OF THE INVENTION

Document feeds for positioning documents in copying apparatuses have heretofore been known but have experienced several difficulties. Document feeds for placing documents on the document glass or exposure plane of a photocopying machine generally involve either drive rolls or drive belts which are positioned to feed documents which are paper sheets having a fairly uniform weight and consistency. As drive forces in the document feed, at least to some extent are determined by the thickness and rigidity of the document itself, the document feed is adjusted and designed for an optimum document weight and inherently experiences difficulties with documents of a significantly different weight. Particular difficulty is experienced in the feeding of what is generally known as onion skin or extremely light weight paper and air mail paper. This is because the sheets are very thin and do not provide a substantial thickness between the drive belts or drive rollers and the plane onto which they are being fed. Since no substantial thickness is introduced between the belts and the plane, the belt is not significantly tensioned, over and above its non-feeding state, and feed of light weight papers is unreliable. Additionally, very light weight paper such as onion skin and air mail papers do not possess the necessary column strength to reliably feed when fed by a technique other than grasping the leading edge and pulling the remainder of the sheet.

An additional difficulty which has been experienced in known document feeds has been difficulty of aligning a document which is slightly out of alignment. Where the belts or feed rolls are relatively forcibly engaged with the document being fed, there is a low degree of slippage and as all belts or feed rolls are generally driven in synchronization with each other, any alignment function requires a slippage between some of the drive elements and the document. When the force between the drive elements and the document is reduced to such a point that alignment of the document is readily accomplished through slippage between the document and the feed belts, there is inadequate force exerted on the document to feed the document reliably.

OBJECTS OF THE INVENTION

It is an object of this invention to more reliably feed documents in a document feed device.

It is another object of this invention to reliably align documents fed by the document feed device such that the alignment corresponds with the work station.

It is still another object of this invention to reliably feed and align varying weights of documents without damage to the documents themselves.

SUMMARY OF THE INVENTION

A document plane on an electrophotographic copying machine is provided in a raised position above the surrounding framework. The document plane has positioned thereover a document feed mechanism which comprises spaced apart support rolls and endless drive belts circumscribing the support rolls. The belts are biased toward the document plane and frictionally engage a raised portion of the inlet apparatus and frictionally engage, in line contact, the second edge or edge member of the document plane corresponding to the exit edge. These two frictional contacts provide line driving regions for feed and removal of the document to and from the document plane.

A selectively actuatable paper gate is provided for stopping and aligning the document on the document plane such that the document may be held in a stationary position during the exposure phase of the photocopying process and then may be selectively released for subsequent transport into the exit tray. Acceleration means is provided to rapidly remove the document from the document plane once the exit gate has been actuated by a control solenoid to permit exit and thus clear the document plane rapidly for the next incoming document. The document feed device is provided with a selectively actuatable picker arrangement whereby the picker initiates feed at a desired time thus inserting the document to be copied into a frictional engagement with the feed belt means thus allowing control of the timing of the feed.

The feeding of the document, the positioning of the document, and the discharge of the document from the document plane are all in timed relationship with the process steps and specifically the exposure step of the electrophotographic process of the electrophotographic machine upon which this apparatus is embodied.

The foregoing and other objects, features and advantages of the invention will be apparent from the following more particular description of preferred embodiments of the invention, as illustrated in the accompanying drawings.

DRAWINGS

FIG. 1 illustrates a view of the document plane wherein the document feed device is exposed and the feed belts are fully visable.

FIG. 2 illustrates a sectional view of the document plane and immediately surrounding framework together with the document feed device viewed along a line 2—2 in FIG. 1)

FIGS. 3, and 4 illustrate alternative embodiments of the leading edge member of the document plane.

DETAILED DESCRIPTION

To allow the exposure of a document to the photoconductive member of an electrophotographic copying apparatus a document plane or document glass 10 is provided. Supporting the document plane 10 is the electrophotographic copier framework generally indicated at 12. To provide a means for mechanically introducing documents onto the document glass 10 and for transporting these documents over the glass 10 and off the glass after exposure, drive belts 14 are positioned over the document glass 10 and in close relation thereto. The drive belts 14 are supported and driven by rolls 16 and 18 which defines their path generally. Feed and support rolls, power rolls 16 and idler roll 18, are mounted in generally parallel relationship to each other and parallel with the document glass 10. Idler roll 18 is positioned such that it extends outwardly from document glass 10 over and above the inlet tray 20 of the document feed device. Inlet tray 20 slopes away from the drive belt path and provides a surface upon which to place a document prior to feeding it to the document glass 10.

On the opposite side of the document glass 10 from the inlet tray 20 or inlet chute 20 is exit tray 22. Exit tray 22 provides a receptacle for the holding and receiving of documents which have previously been exposed to the electrophotographic copying apparatus and then ejected from the copying station. To stop and align a document as it is being fed by the drive belts 14, an exit and aligning gate 24 is mounted retractably next to the exit edge 44 of document glass 10. Exit gate 24 extends in an inter-digitated manner between the drive belts and extends above the surface of document glass 10 sufficiently to intercept and stop the documents as they are fed onto the glass. The stopping action of the gate 24 also provides a reference member against which the leading edge of the document may be aligned by the feed belts 14.

Exit gate 24 is controlled by exit gate solenoid 25 or similar actuating means such that the gate fingers are retracted and removed from the paper feed path thereby allowing any document on the document plane to react to the frictional engagement of belt 14 on the backside of the document and thus urge it from the document glass 10 into the exit tray 22. To ensure adequate tension on the drive belts 14 at the point where the belts engage the exit edge or exit edge member 44, the tension bar 26 is positioned to cause feed belt 14 to circumscribe it and depress the belt below the plane of document glass 10 when the document feed device is in position over the document glass 10.

To initiate the feed of a document at a desired point in time and to avoid feeding at the wrong time during an electrophotographic process, picker rolls 28 supported on picker roll arms 31 are positioned over the entry tray 20 or inlet chute such that when picker roll arms 31 are rotated or pivotally moved in response to the picker roll control means 30, the picker rolls are moved downward onto the back of the document to be fed and the powered rotation of the picker rolls urges the document along the inlet chute 20 into frictional engagement with drive belts 14, which pinch it between edge member 42 and belts 14.

In order to prevent the insertion of a document manually at a time when this would be disadvantageous, stop fingers 32 are positioned inter-digitally with feed belt 14, thus blocking the feed path from the inlet chute 20 to the document glass 10. When picker rolls 28 are frictionally engaged with the document to be fed, the stop fingers 32 are retracted by the same picker roll control means or solenoid 30 which controls the movement of the picker rolls 28.

To ensure that the document plane is cleared of documents after their exposure to the electrophotographic apparatus, accelerator rolls 34 are concentrically positioned on the same shaft as power roll 16. Accelerator rolls 34 are slightly larger in diameter than the power roll which drives belts 14. Thus the peripheral speed of the accelerator rolls 34 when rotating is in access of the linear speed of belt 14. Accelerator rolls 34 are frictionally abutted against backup rolls 36 to provide a nip 37 within which to trap the document.

Idler roll 18 is spring biased to provide some yield when belts 14 are forced down over and wrap around the region of document glass 10. The shaft of idler roll 18 is accommodated in bias slot 40 allowing a small amount of movement to accommodate the changed path of belts 14 when engaged with lead edge member 42 and exit edge member 44.

Belts 14 may alternatively be made of an elastic type of material such as rubber in order to reduce the need for the bias springs 38 and bias slots 40. Likewise tension bar 26 could be replaced by idler rolls which are either fixed or spring biased in order to provide the desired path for belts 14.

Lead edge member 42 as illustrated in FIG. 2 is a ridge or line formed by two planar surfaces meeting at an angle above the plane of document glass 10. As will be made clearer later, this raised portion is important to the invention but it may be in several different forms. FIG. 3 illustrates an alternative embodiment wherein lead edge member 42' is in the form of a rounded convex surface which forms a relatively narrow zone of frictional contact between belt 14 and the edge member 42'. FIG. 4 illustrates still another embodiment of leading edge member 42''. In this embodiment there is a flat surface substantially parallel with the surface of document glass 10 but raised by a slight amount to allow the drive belt 14 to frictionally engage generally the entire flat surface of lead edge member 42''.

With the understanding that any of the alternatives embodiments may be utilized with respect to lead edge member 42, more detailed explanation of the functioning and principles of operation of the document feed device will follow. A document is presented to the document feed device by placing it face down on entry or inlet chute 20. The document is manually urged inward toward document plane or document glass 10 until the document is roughly aligned by engagement with stop fingers 32. At this point, the copier is commanded, through its normal operating mechanisms to copy the document presented in document tray or inlet tray 20. To initiate the feed of the document, the picker roll solenoid is energized thus forcing picker rolls 28 down into frictional engagement with the back surface of the document and retracts stop fingers 32. The powered rotation of picker roll 28 by pulley 27 and belt 29 urges the document leftward as viewed in FIG. 2, such that the document is trapped between belt 14 and inlet chute 20. When the belt is in frictional engagement with the document, it will pull the document into the nip formed by belt 14 and lead edge member 42. It will be readily seen that as the document traverses leading edge member 42, the belt must be displaced away therefrom by an amount equal to the thickness of the document and likewise will be raised slightly from document glass 10. During normal static conditions, belt 14 does not engage the surface of document glass 10 in the region adjacent lead edge member 42. This is due to the elevated portion of lead edge member 42 spacing the belt from document glass 10. Belt 14 then merely constrains the vertical movement of the document to prevent it from flapping and provides some column strength to the document during feed while substantially the entire feed force is exerted along a line by the nip between belt 14 and lead edge member 42. Belt 14 is frictionally engaged with the exit edge 44 of document plane 10 or exit edge member 44 which may be another separate member which is positioned such that belt 14 wraps thereon thus providing a second feeding frictional nip. The exit edge of document glass 10 may be used in lieu of a separate member if the belt 14 provides a sufficient wrap to form the desired nip, as there is no requirement that exit edge member extend above the document glass 10.

As the document traverses the document glass 10 from right to left in FIG. 2, the open space between belt 14 and document glass 10 decreases and eventually a very light urging is felt by the document as it approaches its position for copying. The distance between exit edge member 44 or exit edge of the document glass 10 and the lead edge member 42 is greater than the predetermined width of any documents to be copied. When the trailing edge of the document has passed the feed nip formed by belt 14 and the lead edge member 42, the inertia together with the light driving force of the document will tend to carry it forward and engage exit gate 24. If at this time the document is misaligned the light urging of the feed belts 14 engaging the document in the region of document glass 10 nearest exit gate 24, will tend to orient the document such that the leading edge is in contact with gate 24 thus aligning the document for copying.

Upon completion of the exposure phase of the document copying operation of the electrophotographic apparatus, exit gate solenoid 25 is energized retracting exit gate 24 from the belt path. Belt 14, being in light frictional engagement with the back of the document, will urge the document into the nip formed by exit edge member 44 and belt 14. This force is sufficient to cause the document to begin to be ejected from the surface of document glass 10. As document passes the nip formed by belts 14 and exit edge member 42, it is trapped between the accelerator rolls 34 and backup rolls 36. Since the linear peripheral speed of accelerator rolls 34 is higher than that of the speed of the belt 14 and since the frictional force exerted by accelerator rolls 24 on a document is substantial, the document is urged out of the document glass region at a rate faster than the belts 14 would normally propel it. The accelerator roll 34 and backup rolls 36 eject the document into exit tray 22 for removal by the operator.

At the end of the above sequence as described in this portion, the document feed apparatus is ready to feed a second document.

By the appropriate timing of the actuation of picker solenoid 30 and the operation of picker roll 28, together with the operation of gate solenoid 25 and gate 24, a document may be removed from the document plane and a second document be fed simultaneously. This does not create problems or jams in as much the document being removed from document glass 10 is removed at, at least the same or a higher velocity than the input of the document entering document glass 10. The accelerator rolls act to positively pull the paper from the feed device.

Significant aspects of the principles of operation of this invention can be readily understood by considering that the highest feed forces are exerted on the document whilt it is in the nip formed by belts 14 and leading edge member 42. The other region of relatively high feed force is between belts 14 and exit edge 44 and to a lesser degree between accelerator rolls 34 and back up rolls 36. The relatively high feed force exerted at the lead edge member 42 ensures a positive drive of the document onto document glass 10. The light urging of the belts on the document while on the document glass accomplishes alignment while not exerting such a sufficiently high force as to damage the document in the event it is a very light weight document sheet.

Thus one can readily see that the disadvantages of the prior art apparatus which either exerted too heavy a feed force for extremely light documents in order to accommodate heavy documents or those who exerted insufficient feed force on heavy documents in order to prevent damaging of light documents have been overcome by the use a positive relatively high drive force in a very localized region and then the use of a light force in the vicinity of the document glass 10 thus reducing the tendency to crumple or tear light documents such as onion skin and air mail paper, while still providing reliable document feed.

The document feed device provides reliable feed by positively feeding a document through engagement of the document in a line or narrow zone transverse to the direction of feed. Upon emerging progressively from the line of engagement, the sheet enters a region of no engagement but only lateral constraints to prevent bending of the document. As the document progresses away from the region of no engagement it is gradually lightly re-engaged and lightly urged forward until positively stopped. Upon release the document is positively re-engaged and removed to an accelerator which positively engages and rapidly removes the document from the exposure station.

All the relations described above are a progressive line relation and the entire document is not only positively engaged or constrained or only lightly engaged at one time but rather may be a combination of one or more of these conditions.

The arrangement as disclosed above and the operation thereof will accommodate documents of varying weights and strengths and at the same time provide a highly reliable feed mechanism to position documents on the document glass of electrophotographic copier apparatuses.

One alternative embodiment of the document feed device that is most utilitarian is where the device is hinged to allow its raising above the document glass 10 to provide clearance for manual positioning of books or large multi-page documents or the like.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A document feed device for positioning documents on a document plane of an electrophotographic copier comprising:

feed belt means supported by drive means for driving said feed belt means;

a first and second edge means positioned proximate to the inlet edge and exit edge of said document plane;

said belt means wrapping on said first and said second edge means, said feed belt means, said first and second edge means, and said document glass arranged to define a plurality of regions comprising a first region of positive frictional engagement with a document between said belt means and said first edge means;

a second region of substantially no frictional engagement between said belt means and said document;

a region of increasing frictional engagement between said belt means and said document;

and a further region of positive frictional engagement between said document and said belt together with said second edge means;

thereby providing a positive input drive into a region of substantially no frictional engagement where the document is inserted into said region of substantially no frictional engagement and is then progressively engaged with a progressively increasing frictional engagement with said belt means and is removed from said document plane by a positive engagement in a second region of positive frictional engagement between said belt and said document to feed, position and remove a document from a document plane.

2. A method of feeding and positioning a document on a document plane of an electrophotographic copier comprising:

positively urging said document in the direction of feed through a zone of positive engagement by engaging one side of said document with a driven flat belt and a fixed member engaging said document on said document's second side;

progressively releasing said document from said zone of positive engagement; progressively increasingly re-engaging said document frictionally between said belt and said document plane and urging said document in the direction of feed, such that the normal forces exerted on said document's leading portion is greater than the normal forces on said document's trailing region, after said trailing region has passed said zone of positive engagement;

positively stopping said document and interrupting its forward movement to align said document causing said belt to slip over said document;

and positively feeding said document in the direction of feed to remove said document from said document plane.

3. The method as defined in claim 2, further comprising the step of accelerating said document after the second step of positively feeding said document.

4. The method of feeding a document as defined in claim 2, wherein a plurality of said steps may be simultaneously occurring on different regions of a single document at any point in time.

* * * * *